UNITED STATES PATENT OFFICE.

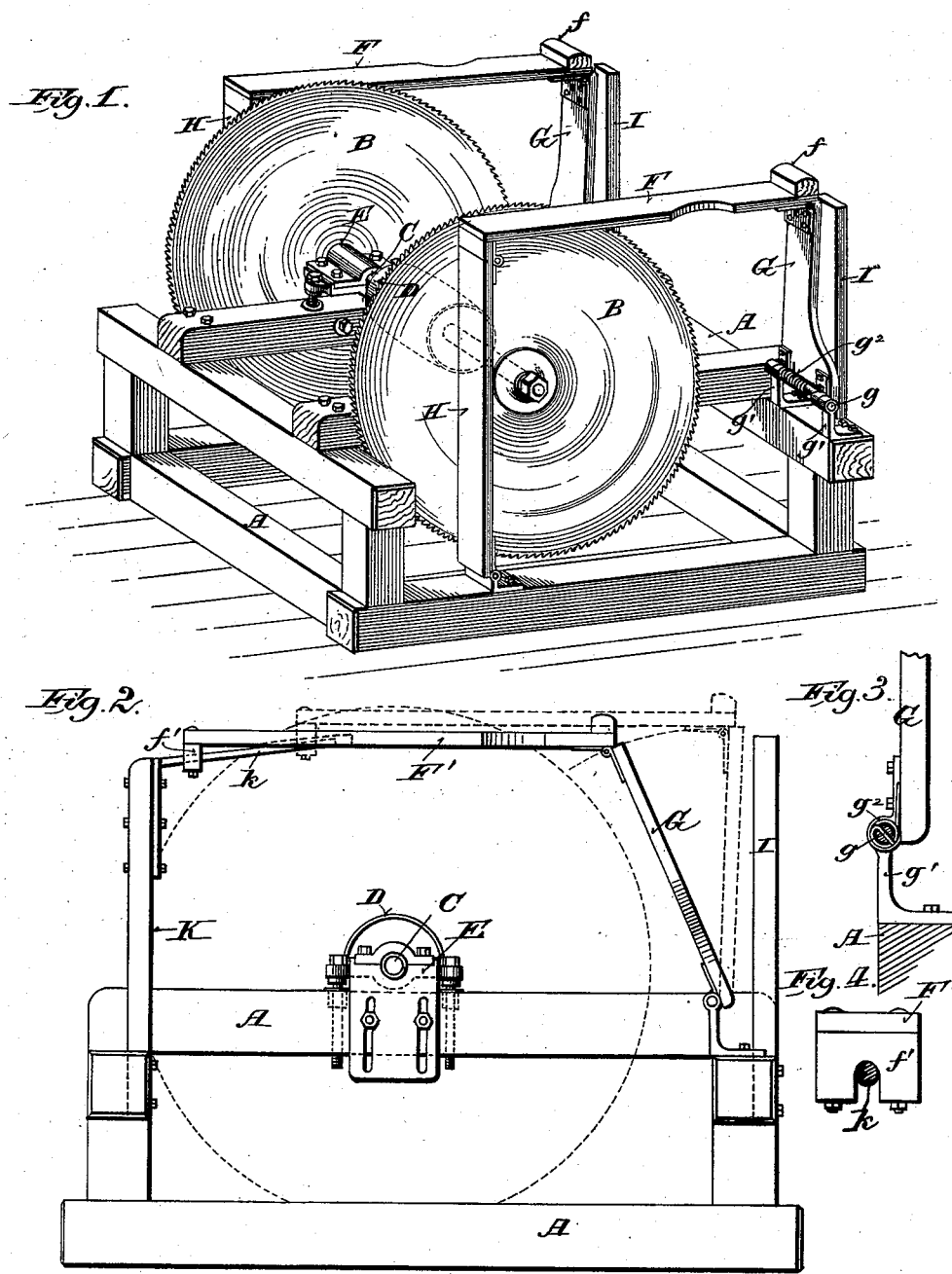

RICHARD D. CODY, OF WINONA, MINNESOTA, ASSIGNOR OF ONE-HALF TO GEORGE CHALLONER'S SONS, OF OSHKOSH, WISCONSIN.

SHINGLE-JOINTING MACHINE.

SPECIFICATION forming part of Letters Patent No. 540,722, dated June 11, 1895.

Application filed May 9, 1889. Serial No. 310,195. (No model.)

*To all whom it may concern:*

Be it known that I, RICHARD D. CODY, of Winona, in the county of Winona and State of Minnesota, have invented certain new and useful Improvements in Shingle-Jointing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to facilitate holding the shingles in the proper position; to give them the desired movement with reference to the saw for the purpose of jointing their edges; and to avoid friction in the movement of the shingle support or supports.

It consists essentially of a shingle supporting carriage capable of a combined endwise and descending movement with reference to the jointing saw and of certain peculiarities of construction and arrangement hereinafter particular described and pointed out in the claims.

In the accompanying drawings like letters designate the same parts in the several figures.

Figure 1 is a perspective view of my improved shingle-jointing machine. Fig. 2 is a side elevation of the same, showing a modification of the means for supporting the shingle-carriage at one end. Figs. 3 and 4 are details, on an enlarged scale, of parts of the carriage-supporting devices.

A represents suitable framework for the machine; B B, two jointing saws mounted on the ends of a horizontal arbor C which is supported in vertically adjustable boxes E E just inside of the saws.

D is a pulley mounted on the middle of the arbor C in position to be connected by a belt with a suitably located driving pulley.

F F are shingle carriages supported normally in a horizontal position just outside of the saws B B upon the vibratory upright arms or standards G G and H H to the upper ends of which said carriages are hinged at the ends. At their lower ends the standards G and H are hinged to the frame A so as to swing forward and backward in vertical planes parallel with the planes of the saws and lengthwise of the carriages F F.

The standards G G are preferably broadened at the base and hinged upon rods $g$ $g$ which are secured at the ends in brackets $g'$ $g'$ attached to frame A and the carriages F F are thereby restrained from lateral or sidewise movement. By means of springs $g^2$ coiled around and attached at one end to the fixed rods $g'$ $g'$ and attached at the other end to the standards G G as shown in Figs. 1 and 3, said standards are brought to an upright position and the carriages F F are returned to their normal or initial positions when released by the operator.

Each carriage F is provided near its rear end with a transverse gage or shoulder $f$ against which the butt of the shingle is placed and held while it is jointed.

Referring to Figs. 2 and 4, in place of the vibratory standards H hinged to and supporting the front ends of the carriages F F, as hereinbefore described, the front end of each carriage F' is provided on the under side with a grooved bearing block $f'$ (shown in front elevation in Fig. 4), which is supported and arranged to slide upon an inclined bar $k$ attached to a stationary upright K provided for the purpose on frame A. The backward movement of the carriages F F is arrested at the proper point by fixed posts I I or other suitable stops.

By the construction and arrangement of the carriage supports hereinbefore described, friction incident to sliding bearings is avoided to a great extent, and a combined drop and endwise movement is given to the carriages, thereby preventing the splintering of the wood which would occur if the shingles were brought directly sidewise against the saw, and at the same time permitting of less endwise movement of the carriages than would be necessary without the drop or descending movement thereof. This descending and forward movement of the carriage advances the material to be operated on by a forward and downward movement so as to present it at more of a tangent to the periphery of the saw, and at the same time advance it endwise along the cutting edge of the saw. By locating the bearings for the arbor C inside of the saws the latter can be readily removed or replaced when desired without disturbing the other parts of the machine. The vertically adjustable boxes E E afford means for raising or lowering the arbor C for larger or smaller saws or for readjusting the saws, as they wear, with reference to the carriages F F.

It is obvious that various modifications may be made in the details of construction of the machine within the intent and spirit of my invention, and therefore I do not wish to be understood as confining myself to the precise mechanical construction shown and described in illustration of my invention.

In operation the shingle is placed with its butt against the shoulder $f$ and the edge to be trimmed overhanging the inner edge of the carriage F. The carriage is then moved forward and downward carrying the shingle past the cutting edge of the saw which joints the overhanging edge thereof. When released the carriage is automatically returned to its first position by the spring $g^2$.

I claim—

1. In a shingle jointing machine, the combination with a suitable frame and a circular saw mounted thereon, of a vibrating arm hinged to said frame, and a reciprocating rising and falling shingle supporting carriage hinged to said arm and supported by it in a plane near the upper edge of the saw, said arm having a forward and downward movement beyond a substantially vertical line to cause said carriage to descend, and at the same time to advance endwise along the cutting edge of the saw, and thus advance the material by a forward and downward movement, substantially as and for the purposes described.

2. In a shingle jointing machine, the combination with a suitable frame and a circular saw journaled therein, of a vibrating supporting arm hinged at its lower end to said frame, a reciprocating rising and falling carriage hinged to said arm and supported by it in a plane near the upper edge of the saw, said arm having a forward and downward movement beyond a substantially vertical line to cause said carriage to descend and at the same time to advance endwise past the cutting edge of the saw and thus advance the material by a forward and downward movement, a stop by which said supporting arm is arrested in its backward movement, and a spring by which said arm is returned to said stop after being swung forward, substantially as and for the purposes described.

3. In a shingle jointing machine, the combination with a circular saw and its arbor and a suitable frame provided with adjustable bearings for said arbor, of a reciprocating rising and falling shingle supporting carriage and an upright vibratory arm hinged at its upper end to said carriage and at its lower end to said frame, so as to support, when in a vertical position, the carriage in a plane near the upper edge of the saw, and when moved forward, to cause said carriage to descend and at the same time to advance endwise along the cutting edge of the saw, substantially as and for the purposes set forth.

4. In a shingle jointing machine, the combination with a suitable frame, provided with vertically adjustable bearings, and an arbor mounted in said bearings, and provided with two circular saws which are fixed thereon, of two reciprocating rising and falling shingle supporting carriages, upright, vibratory supporting arms, hinged at their lower ends to said frame and at their upper ends to said carriages, so as to support, when they are in a vertical position, the carriages in a plane near the upper edges of the saws, and when swung forward, to cause said carriages to descend and at the same time to advance endwise along the cutting edges of the saws, substantially as and for the purposes set forth.

In testimony that I claim the foregoing as my own I affix my signature in presence of two witnesses.

RICHARD D. CODY.

Witnesses:
G. H. SNOW,
JOHN J. TRIPPE.